US012592204B2

(12) United States Patent
Chen et al.

(10) Patent No.: US 12,592,204 B2
(45) Date of Patent: Mar. 31, 2026

(54) STACKED-SCREEN DISPLAY DEVICE AND METHOD FOR CONTROLLING DISPLAY DEVICE

(71) Applicants: Fuzhou BOE Optoelectronics Technology Co., Ltd., Fuzhou (CN); BOE TECHNOLOGY GROUP CO., LTD., Beijing (CN)

(72) Inventors: Xin Chen, Beijing (CN); Kai Diao, Beijing (CN); Qingna Hou, Beijing (CN); Meizhen Chen, Beijing (CN); Hongzhou Xie, Beijing (CN); Renhui Yu, Beijing (CN); Ying Tian, Beijing (CN); Xiaoyang Liu, Beijing (CN); Hui Yu, Beijing (CN); Chengkun Liu, Beijing (CN)

(73) Assignees: Fuzhou BOE Optoelectronics Technology Co., Ltd., Fuzhou (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/763,850

(22) Filed: Jul. 3, 2024

(65) Prior Publication Data

US 2024/0355299 A1     Oct. 24, 2024

Related U.S. Application Data

(63) Continuation of application No. 17/904,782, filed as application No. PCT/CN2021/129767 on Nov. 10, 2021, now Pat. No. 12,073,800.

(30) Foreign Application Priority Data

Dec. 25, 2020    (CN) ......................... 202011562882.2

(51) Int. Cl.
    *G09G 3/34*        (2006.01)
    *G02F 1/1333*     (2006.01)
           (Continued)

(52) U.S. Cl.
    CPC ....... *G09G 3/342* (2013.01); *G02F 1/133605* (2013.01); *G02F 1/133606* (2013.01);
           (Continued)

(58) Field of Classification Search
    CPC .............. G09G 3/342; G02F 1/133605; G02F 1/133606; G02F 1/133608
    See application file for complete search history.

(56) References Cited

U.S. PATENT DOCUMENTS

2007/0200977 A1    8/2007   Egi et al.
2008/0151965 A1    6/2008   Kim
           (Continued)

FOREIGN PATENT DOCUMENTS

CN       1949356 A     4/2007
CN     101206839 A     6/2008
           (Continued)

OTHER PUBLICATIONS

State Intellectual Property Office of the People's Republic of China, Office Action and Search Report Issued in Application No. 202011562882.2, Dec. 31, 2024, 22 pages. (Submitted with Partial Translation).
           (Continued)

*Primary Examiner* — Lucy P Chien
(74) *Attorney, Agent, or Firm* — McCoy Russell LLP

(57) ABSTRACT

A stacked-screen display device and a method for controlling a display device are provided. The stacked-screen display device includes a backlight module, a light control panel and a display panel which are stacked in sequence, where the backlight module includes a backplane, a reflector (Continued)

and a diffuser which are stacked in sequence, and the reflector is provided with a plurality of light-emitting units, the backlight module is provided with temperature sensors, the temperature sensors are configured to detect the temperature of the backlight module to compensate the display panel according to the temperature.

20 Claims, 5 Drawing Sheets

(51) Int. Cl.
    *G02F 1/13357*      (2006.01)
    *G02F 1/1347*       (2006.01)
    *G09G 3/36*         (2006.01)

(52) U.S. Cl.
    CPC ...... *G02F 1/133608* (2013.01); *G02F 1/1347* (2013.01); *G09G 3/36* (2013.01); *G02F 1/133382* (2013.01); *G02F 1/133611* (2013.01); *G09G 2320/0233* (2013.01); *G09G 2320/0242* (2013.01); *G09G 2320/0276* (2013.01); *G09G 2320/041* (2013.01); *G09G 2320/0666* (2013.01)

(56) References Cited

U.S. PATENT DOCUMENTS

| | | |
|---|---|---|
| 2009/0033646 A1 | 2/2009 | Liu et al. |
| 2009/0322800 A1* | 12/2009 | Atkins ................. G09G 3/3426 |
| | | 345/102 |
| 2010/0259572 A1 | 10/2010 | Yang et al. |
| 2013/0050165 A1 | 2/2013 | Northway et al. |
| 2014/0354185 A1 | 12/2014 | Yoshida |
| 2015/0308707 A1* | 10/2015 | Tanaka ................... G05B 15/02 |
| | | 700/276 |
| 2018/0277047 A1 | 9/2018 | Dai et al. |
| 2019/0371237 A1 | 12/2019 | Qian et al. |
| 2020/0170087 A1* | 5/2020 | Sato ..................... G02F 1/1323 |
| 2020/0278586 A1 | 9/2020 | Kimura et al. |

FOREIGN PATENT DOCUMENTS

| | | | | |
|---|---|---|---|---|
| CN | 201654370 U | 11/2010 | | |
| CN | 102997132 A | 3/2013 | | |
| CN | 103827951 A | 5/2014 | | |
| CN | 103959027 A | 7/2014 | | |
| CN | 205583089 U | 9/2016 | | |
| CN | 106226938 A | 12/2016 | | |
| CN | 108761886 A | 11/2018 | | |
| CN | 109616079 A | 4/2019 | | |
| CN | 110221470 A | 9/2019 | | |
| CN | 110570818 A | 12/2019 | | |
| CN | 110967859 A | 4/2020 | | |
| CN | 215181300 U | 12/2021 | | |
| JP | 2004071271 A | * | 3/2004 | |
| JP | 2007093939 A | 4/2007 | | |
| JP | 2020140157 A | 9/2020 | | |
| WO | 2014063391 A1 | 5/2014 | | |
| WO | WO-2016047222 A1 | * | 3/2016 | .............. A61B 1/06 |
| WO | 2017215142 A1 | 12/2017 | | |

OTHER PUBLICATIONS

ISA China National Intellectual Property Administration, International Search Report and Written Opinion Issued in Application No. PCT/CN2021/129767, Jan. 30, 2022, WIPO, 17 pages. (Submitted with Partial Translation).
United States Patent and Trademark Office, Notice of Allowance Issued in U.S. Appl. No. 17/904,782, filed Apr. 22, 2024, 18 pages.

* cited by examiner

VCC
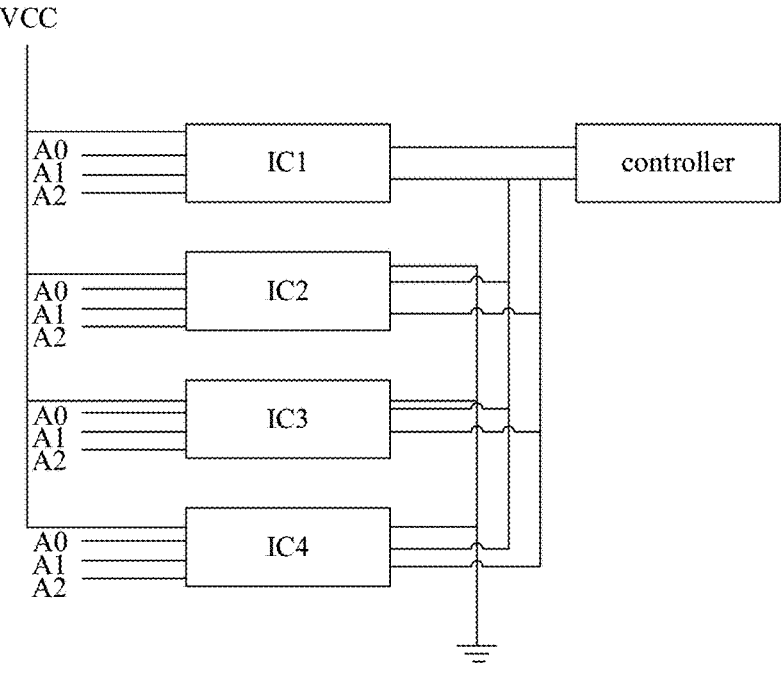
Fig.8
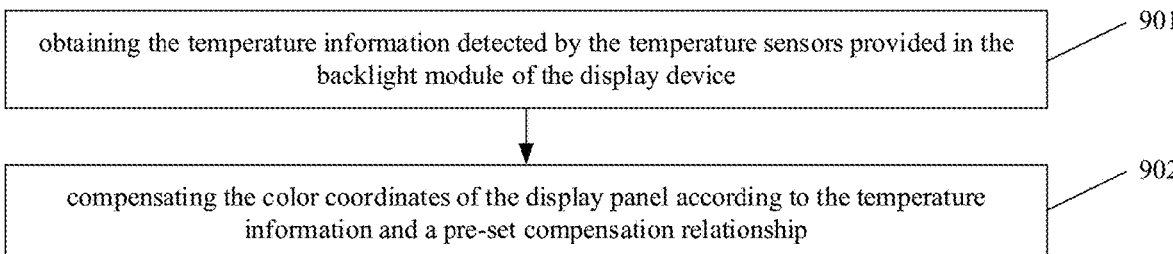
Fig.9
| time_min | Panel surface_°C | Wx | Wy | target Wx/Wy | corresponding ACC table |
|---|---|---|---|---|---|
| 0 | 24.01 | 0.331 | 0.354 | 0.311/0.329 | ACC table 1 |
| 10 | 40.14 | 0.321 | 0.349 | 0.313/0.329 | ACC table 2 |
| 20 | 47.39 | 0.317 | 0.347 | 0.313/0.329 | ACC table 3 |
| 30 | 51.31 | 0.314 | 0.346 | 0.313/0.329 | ACC table 4 |
Fig.10

| GAMMA | R | G | B |
|---|---|---|---|
| 0 | 0 | 0 | 0 |
| 1 | 1 | 1 | 0 |
| 2 | 3 | 2 | 1 |
| 3 | 4 | 3 | 2 |
| 4 | 6 | 4 | 3 |
| 5 | 8 | 5 | 4 |
| 6 | 9 | 6 | 5 |
| 7 | 11 | 7 | 6 |
| 8 | 12 | 9 | 7 |
| ... | ... | ... | ... |
| 1014 | 4005 | 3744 | 3657 |
| 1015 | 4012 | 3748 | 3660 |
| 1016 | 4019 | 3751 | 3664 |
| 1017 | 4026 | 3754 | 3668 |
| 1018 | 4033 | 3757 | 3672 |
| 1019 | 4040 | 3760 | 3676 |
| 1020 | 4053 | 3764 | 3680 |
| 1021 | 4066 | 3768 | 3684 |
| 1022 | 4079 | 3772 | 3688 |
| 1023 | 4092 | 3776 | 3692 |

Fig.11

| | color coordinates before adjusting | | color coordinates after adjusting | |
|---|---|---|---|---|
| Gamma | Wx | Wy | Wx | Wy |
| 0 | 0.27328 | 0.28437 | 0.31352 | 0.32942 |
| 4 | 0.27453 | 0.2872 | 0.31325 | 0.32906 |
| 8 | 0.2767 | 0.29131 | 0.31366 | 0.3291 |
| 12 | 0.27782 | 0.29427 | 0.31364 | 0.3294 |
| 1008 | 0.31345 | 0.34485 | 0.31341 | 0.32915 |
| 1012 | 0.31376 | 0.34575 | 0.3132 | 0.32906 |
| 1016 | 0.31436 | 0.34618 | 0.31323 | 0.32924 |
| 1020 | 0.31438 | 0.34629 | 0.31332 | 0.32901 |

Fig.12

STACKED-SCREEN DISPLAY DEVICE AND METHOD FOR CONTROLLING DISPLAY DEVICE

CROSS REFERENCE OF RELATED APPLICATION

This application is a continuation application of U.S. Non-Provisional patent application Ser. No. 17/904,782, entitled "STACKED-SCREEN DISPLAY DEVICE AND METHOD FOR CONTROLLING DISPLAY DEVICE", and filed on Aug. 22, 2022, which is a U.S. National Phase of International Application PCT/CN2021/129767 filed on Nov. 10, 2021, which claims a priority to the Chinese Patent Application No. 202011562882.2 filed on Dec. 25, 2020. The entire contents of the above-listed are hereby incorporated by reference for all purposes.

TECHNICAL FIELD

The present disclosure relates to the field of display technology, in particular to a stacked-screen display device and a method for controlling the display device.

BACKGROUND

A liquid crystal display device needs to be provided with a backlight source, and the backlight source may generate more heat during operation, thus resulting in a change in overall temperature of the display device, and the change in the temperature of the display device may cause a change in a color temperature of the display device, affecting a display effect.

SUMMARY

In a first aspect, a stacked-screen display device is provided according to embodiments of the present disclosure, including: a backlight module, a light control panel and a display panel which are stacked in sequence, where the backlight module includes a backplane, a reflector and a diffuser which are stacked in sequence, and the reflector is provided with a plurality of light-emitting units, the backlight module is provided with temperature sensors, the temperature sensors are configured to detect a temperature of the backlight module to compensate the display panel according to the temperature.

In one embodiment of the present disclosure, the reflector is in a shape of rectangular; the reflector has a first central axis and a second central axis which are perpendicular to each other; the temperature sensors are arranged on a side of the reflector close to the diffuser and the temperature sensors are symmetrically distributed with respect to the first central axis and the second central axis.

In one embodiment of the present disclosure, the reflector is divided into four rectangular sub-areas by the first central axis and the second central axis, and the temperature sensors are symmetrically distributed in each sub-area with respect to two central axes of the sub-area.

In one embodiment of the present disclosure, a quantity of the temperature sensors is four, and the four temperature sensors are each located at the geometric center of the sub-area.

In one embodiment of the present disclosure, the light-emitting units are arranged on the reflector at equal intervals along a first direction and a second direction, respectively, to form an array of light-emitting units, where the first direction and the second direction are different directions, the temperature sensors are located at a geometric center of the nearest four lighting units.

In one embodiment of the present disclosure, the quantity of the temperature sensors is four, and the four temperature sensors are respectively located at four vertices of the backlight module.

In one embodiment of the present disclosure, at the edge of the backlight module, the reflector forms a bending portion bending away from the backplane; a rubber frame is provided between the bending portion and the backplane, at least part of a surface of the rubber frame extends along the surface of the backplane and a surface of the bending portion, and respectively abuts against the backplane and the reflector; an accommodating cavity is formed inside the rubber frame, and the temperature sensors are located inside the accommodating cavity.

In one embodiment of the present disclosure, a backing plate is further included between the backplane and the reflector, the backing plate includes an edge portion extending between the bending portion and the backplane, and two opposite surfaces of the edge portion respectively abuts against the rubber frame and the backplane; the temperature sensors are arranged at a portion of the rubber frame abutting against the edge portion, and the temperature sensors are located on a surface of a side of the rubber frame away from the backplane.

In one embodiment of the present disclosure, each of the temperature sensors includes an input end for obtaining an input signal, an output end for outputting a temperature signal and a plurality of address ends for obtaining address signals, input ends of the plurality of temperature sensors are connected to an input voltage end providing the same input signal, output ends of the plurality of temperature sensors are all connected to an output bus, and address signals corresponding to each of the temperature sensors are obtained through the plurality of address end.

In a second aspect, a method for controlling the display device is provided according to the embodiments of the present disclosure, comprising:

detecting a temperature of a backlight module by the temperature sensors provided in the backlight module of the display device;

determining a temperature of a display panel of the display device according to the backlight module; and compensating color coordinates of the display panel according to a preset compensation table corresponding to the temperature of the display panel.

In one embodiment of the present disclosure, the backlight module includes N backlight areas and N groups of temperature sensors arranged corresponding to the N backlight areas, in each group of temperature sensors, the quantity of the temperature sensors is one or more, and the display panel includes N display areas corresponding to the N backlight areas;

the detecting the temperature of the backlight module by the temperature sensors provided in the backlight module of the display device comprises:

detecting temperatures of the N backlight areas by the N groups of temperature sensors respectively;

the determining the temperature of the display panel of the display device according to the backlight module comprises:

determining a temperatures of the N display areas according to the temperatures of the N backlight areas respectively; and the compensating the color coordinates of the display
    panel according to the preset compensation table cor-
    responding to the temperature of the display panel
    comprises:
    compensating the N display areas according to the tem-
        peratures of the N display areas respectively.
In one embodiment of the present disclosure, each of the
temperature sensors includes an output end for outputting a
temperature signal and a plurality of address ends for
obtaining address signals, input ends of the plurality of
temperature sensors are coupled to an input voltage end
providing the same input signal, and output ends of the
plurality of temperature sensors are all connected to an
output bus;
    the detecting the temperature of the backlight module by
        the temperature sensors provided in the backlight mod-
        ule of the display device comprises:
    obtaining address signals and temperature signals trans-
        mitted by the plurality of temperature sensors via the
        output bus;
    determining a correspondence between the temperature
        signals and the backlight areas according to the address
        signals; and
    determining a temperature of each of the backlight areas
        according to the temperature signals.
In one embodiment of the present disclosure, the deter-
mining the temperature of the display panel of the display
device according to the backlight module comprises:
    obtaining a preset correspondence, where the preset cor-
        respondence is the change relationship between a tem-
        perature difference measured in advance between the
        backlight module and the display panel in relation to
        working time of the display device; and
    calculating the temperature of the display panel according
        to the preset correspondence and the temperature of the
        backlight module.
In one embodiment of the present disclosure, the obtain-
ing the preset correspondence comprising:
    taking the temperature of the backlight module when the
        display device is not in operation detected by the
        temperature sensors as an ambient temperature; and
    determining a preset correspondence matching the ambi-
        ent temperature according to the ambient temperature.

BRIEF DESCRIPTION OF THE DRAWINGS

In order to illustrate the technical solutions of the present
disclosure in a clearer manner, the drawings desired for the
present disclosure will be described hereinafter briefly.
Obviously, the following drawings merely relate to some
embodiments of the present disclosure, and based on these
drawings, a person skilled in the art may obtain the other
drawings without any creative effort.

FIG. 8 is a schematic view of a connection relationship of
the temperature sensors according to an embodiment of the
present disclosure;
FIG. 9 is a flow chart of a method for controlling the
display device according to an embodiment of the present
disclosure;
FIG. 10 is a schematic view of a compensation relation-
ship according to an embodiment of the present disclosure;
FIG. 11 is a partial schematic view of a compensation
table according to an embodiment of the present disclosure;
FIG. 12 is a schematic view of adjusting color coordinates
according to an embodiment of the present disclosure.

DETAILED DESCRIPTION

Figure 1:
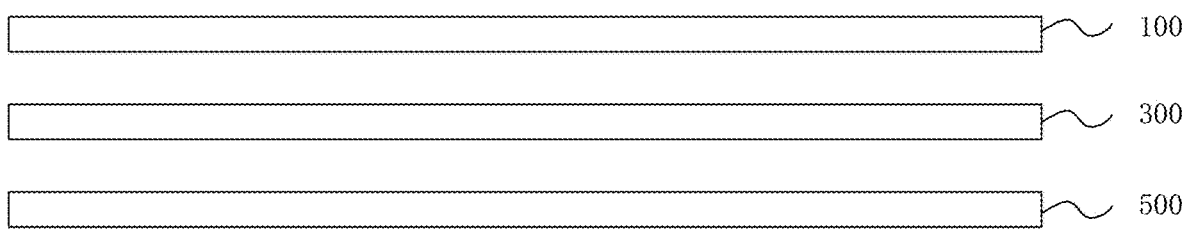
FIG. 1 is a structural schematic view of a display device
according to an embodiment of the present disclosure.
Figure 2:
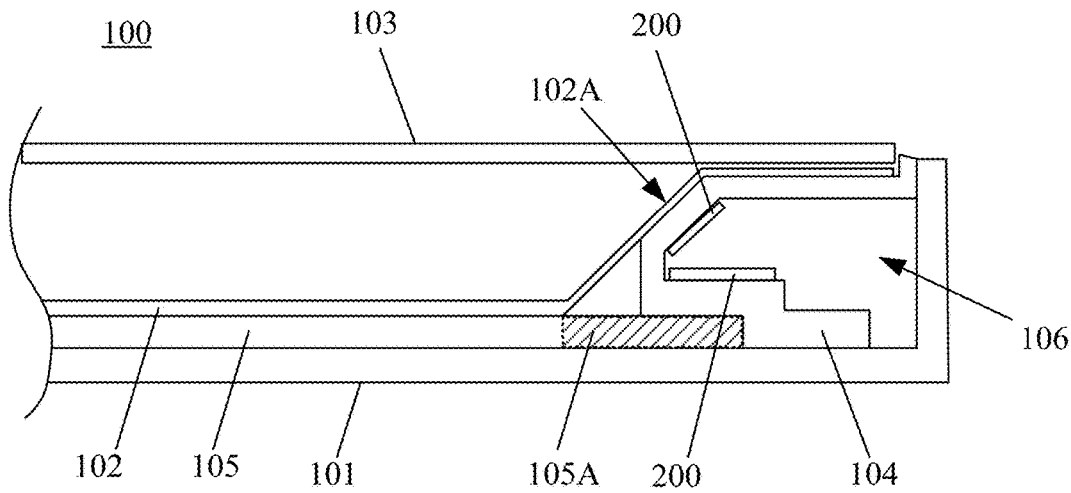
FIG. 2 is a schematic view of a partial structure of a
backlight module according to an embodiment of the present
disclosure.

The present disclosure will be described hereinafter in a
clear and complete manner in conjunction with the drawings
and embodiments. Obviously, the following embodiments
merely relate to a part of, rather than all of, the embodiments
of the present disclosure, and based on these embodiments,
a person skilled in the art may, without any creative effort,
obtain the other embodiments, which also fall within the
scope of the present disclosure.
    A stacked-screen display device is provided in the
embodiments of the present disclosure.
    As shown in FIG. 1, in one embodiment, the stacked-
screen display device includes a backlight module 100, a
light control panel 300 and a display panel 500 which are
stacked in sequence, the light control panel 300 (or called a
Sub panel) includes a plurality of light control pixels, and
the display panel 500 (or called a Main panel) includes a
plurality of display pixels.
    A main difference between the light control panel 300 and
the display panel 500 is that the display panel 500 further
includes a color filter, and the light control panel 300 is
configured to control passing of light at a pixel level or even
at a sub-pixel level through liquid crystal deflection, so as to
improve display contrast of the display device and the
display effect.
    As shown in FIG. 2, in one embodiment, the backlight
module 100 includes a backplane 101, a reflector 102 and a
diffuser 103 which are stacked in sequence, and the reflector
102 is provided with a plurality of light-emitting units 107.
Where the light-emitting units 107 can be a light source such
as a diode that provides illumination. The reflector 102 is
configured to reflect light to a side away from the backplane
101 so as to enable the light to be more transmitted to the
display panel to improve display brightness. The diffuser
103 is configured to make the light more uniform.
    The backlight module 100 further includes temperature
sensors 200, which are configured to detect a temperature of
the backlight module 100 to compensate the display panel
according to the temperature.
    It should be understood that due to a limitation of oper-
ating efficiencies of the light-emitting units 107, a part of
electric energy is converted into thermal energy during
operation, so that the temperature of the display device rises.
The backlight module 100 is one of the main heat sources
during operation of the display device.
    Under influence of a temperature change of the backlight
module 100, the temperature of the display panel also changes to a certain extent, and further influences the display effect of the display panel to a certain extent.

The skilled person in a course of implementing the present disclosure finds that if temperature sensors 200 are arranged in a display area (AA) of the display panel, the display effect may be affected. For example, a portion of light may be blocked to affect brightness of the display panel. If the temperature sensors 200 are arranged in a peripheral area of the display panel, the temperature of the display panel may be less effectively detected. In addition, if the temperature sensors 200 are arranged on the display panel, a manufacturing process of the display panel needs to be adjusted, resulting in a significant increase in production and development costs. Stability and reliability of a product may be lowered compared to a relatively-mature existing display panel.

The skilled person also finds that since the heat of the display panel mainly comes from the backlight module 100, the temperature of the display panel can be further determined by detecting the temperature of the backlight module 100 so as to compensate for the display effect of the display panel.

Figure 3:
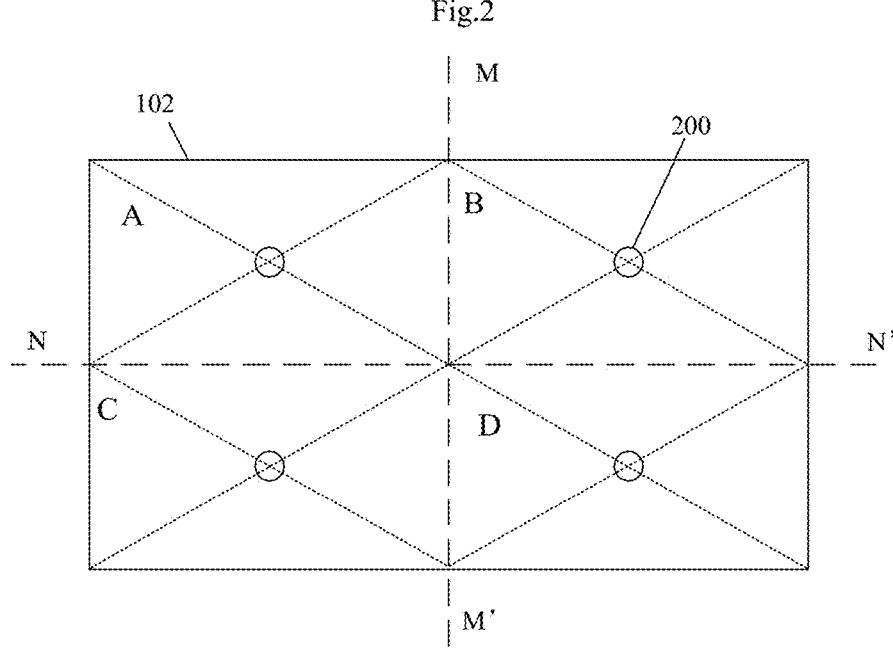
FIG. 3 is a schematic view of an arrangement of tem-
perature sensors according to an embodiment of the present
disclosure.

As shown in FIG. 3, in one embodiment, the reflector 102 is in a shape of rectangular, and has a first central axis MM' and a second central axis NN' which are perpendicular to each other. Positions of a plurality of temperature sensors 200 are symmetrically distributed with respect to the first central axis MM' and the second central axis NN'. The temperature sensors 200 are arranged on the reflector 102, and are located between the reflector 102 and the diffuser 103. It can also be understood that the temperature sensors 200 are arranged on a side of the reflector 102 close to the diffuser 103 or on a side of the reflector 102 away from the backplane 101.

Figure 4:
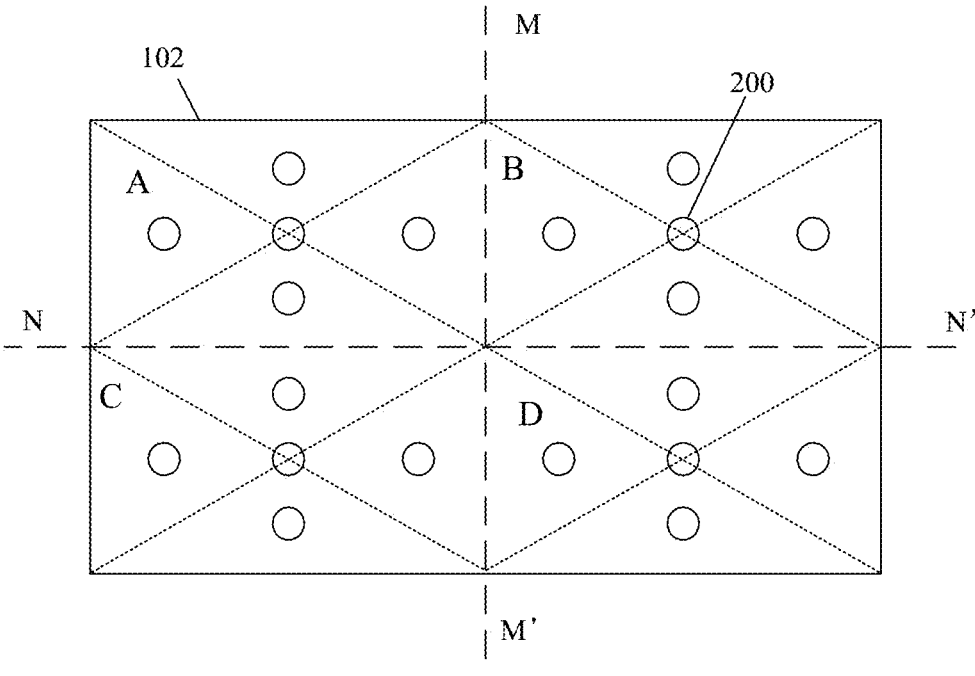
FIG. 4 is another schematic view of the arrangement of
the temperature sensors according to an embodiment of the
present disclosure.

As shown in FIG. 3 and FIG. 4, the reflector 102 has the first central axis MM 'and the second central axis NN' perpendicular to each other, and it can be understood that the first central axis MM' and the second central axis NN' are respectively midpoints of two groups of opposite sides of the rectangular reflector 102. The plurality of temperature sensors 200 are symmetrically distributed about the first central axis MM' and the second central axis NN', so that position distribution of the temperature sensors 200 is relatively uniform, and enables accurate temperature detection for the backlight module.

The embodiment of the present disclosure achieves the detection of the temperature of the backlight module 100 by providing the plurality of temperature sensors 200, and the positions of the plurality of sensors are symmetrically distributed with respect to the first central axis and the second central axis of the backlight module 100, so that the detection accuracy of the temperature of the backlight module 100 can be improved, thereby contributing to the improvement of the compensation effect on the display panel.

As shown in FIG. 3 and FIG. 4, in some embodiments, the reflector 102 is divided into four rectangular sub-areas A, B, C and D by the first central axis MM' and the second central axis NN'. The temperature sensors 200 are symmetrically distributed in each sub-region with respect to two central axes of the sub-region.

Exemplarily, as shown in FIG. 3, in one embodiment, a quantity of temperature sensors 200 is four, and the four temperature sensors 200 are each located at a geometric center of the sub-area. As shown in FIG. 4, more temperature sensors 200 may be provided and distributed symmetrically within each sub-area, contributing to the detection accuracy for the temperature further improved.

The light-emitting units 107 are arranged on the reflector 102 at equal intervals along a first direction and a second direction, respectively, to form an array of light-emitting units, where the first direction and the second direction are different directions.

Positions of adjacent two columns of the light-emitting units 107 are aligned in the first direction and the second direction, or the adjacent two columns of the light-emitting units 107 are staggered in the first direction and the second direction.

Figure 5:
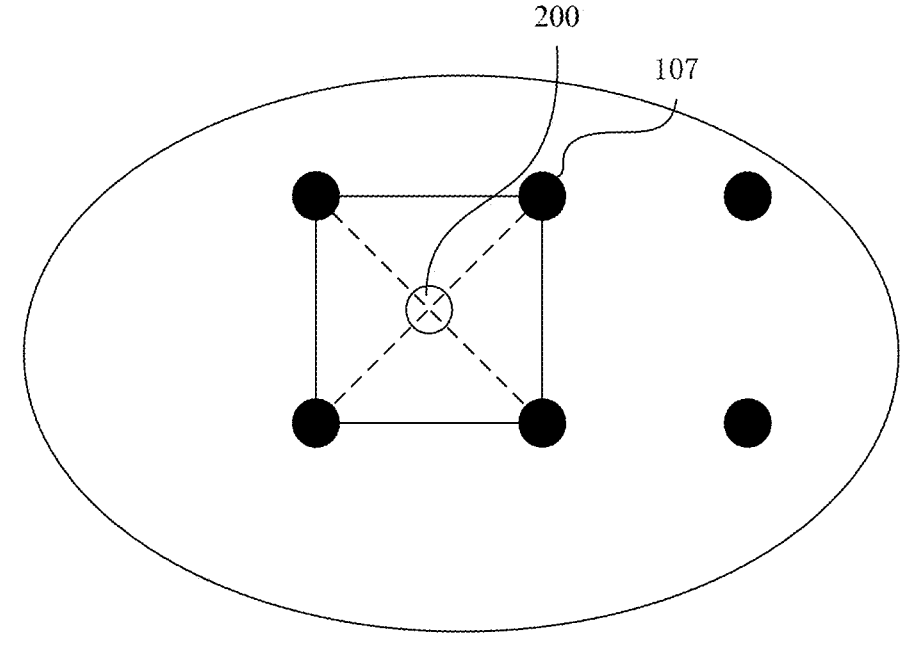
FIG. 5 is a schematic view of positions of the temperature
sensors and light-emitting units according to an embodiment
of the present disclosure.
Figure 6:
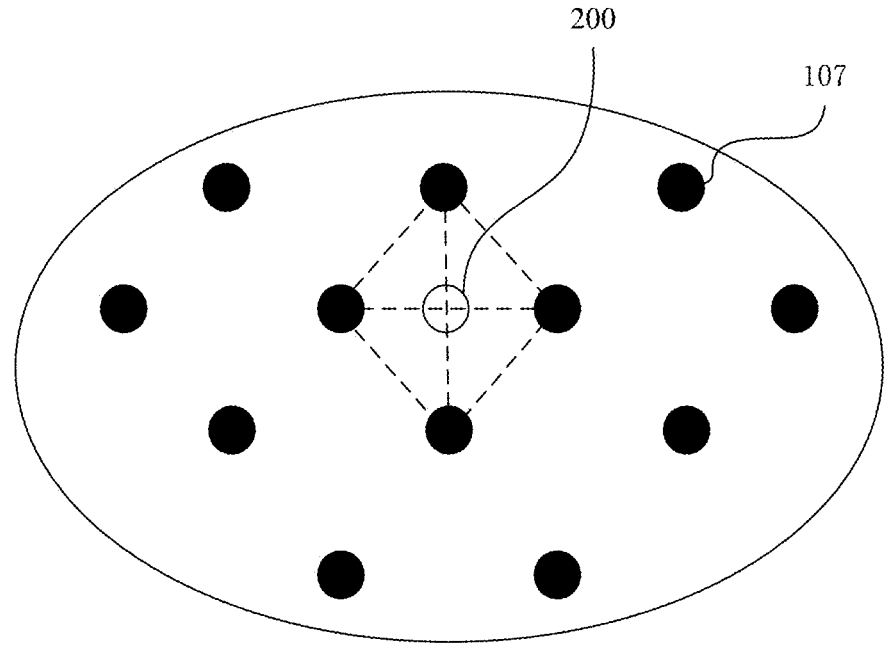
FIG. 6 is another schematic view of positions of the
temperature sensors and the light-emitting units according to
an embodiment of the present disclosure.

As shown in FIG. 5 and FIG. 6, in the present embodiment, illustratively, the first direction is a lateral direction, and the second direction is a longitudinal direction. As shown in FIG. 5, two adjacent columns of the light-emitting units 107 can be arranged in alignment, and as shown in FIG. 6, two adjacent columns of the light-emitting units 107 can also be arranged in a staggered manner, and both can form an array of light-emitting units 107 arranged at equal intervals. The temperature sensors are located at a geometric center of the four nearest lighting units 107.

As shown in FIG. 5 and FIG. 6, the temperature sensors are arranged at the geometric center of the four nearest light-emitting units 107. Specifically, the geometric center of the four nearest light-emitting units 107 can be a diagonal intersection point of the four light-emitting units 107 arranged in a rectangular or parallelogram shape, which contributes to reducing the influence on the light-emitting units 107.

Figure 7:
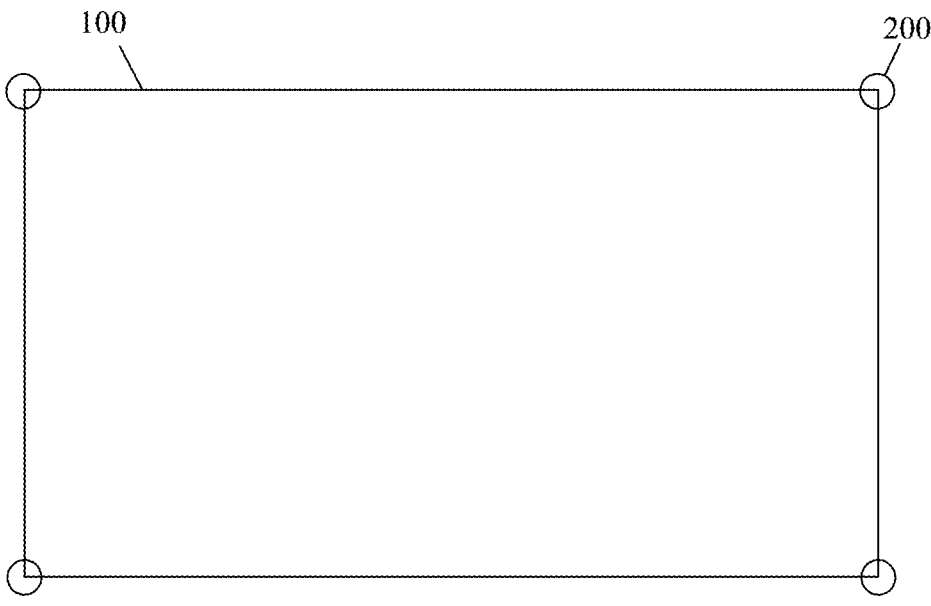
FIG. 7 is another schematic view of the arrangement of
the temperature sensors according to an embodiment of the
present disclosure.

As shown in FIG. 7, in some embodiments, the quantity of temperature sensors 200 is four, and the four temperature sensors 200 are respectively located at four vertices of the backlight module 100.

By arranging the temperature sensors 200 at the four vertices of the backlight module 100, the temperature detection of the backlight module 100 can also be realized, and at the same time, thickness of the backlight module 100 can also be reduced.

As shown in FIG. 2, at an edge of the backlight module 100, the reflector 102 forms a bending portion 102A bending away from the backplane 101. A rubber frame 104 is provided between the bending portion 102A and the backplane 101. At least part of a surface of the rubber frame 104 extends along the surface of the backplane 101 and a surface of the bending portion 102A, and respectively abuts against the backplane 101 and the reflector 102. An accommodating cavity 106 is formed inside the rubber frame 104, and the temperature sensors 200 are located inside the accommodating cavity 106.

By forming the bending portion 102A by bending the reflector 102, the accommodating cavity 106 for accommodating the temperature sensors 200 can be provided without increasing the thickness of the backlight module 100, thereby reducing space required to be occupied.

As shown in FIG. 2, in some embodiments, a backing plate 105 is further included between the backplane 101 and the reflector 102. The backing plate 105 includes an edge portion 105A extending between the bending portion 102A and the backplane 101. Two opposite surfaces of the edge portion 105A respectively abuts against the rubber frame 104 and the backplane 101. The temperature sensors 200 are arranged at the portion of the rubber frame 104 abutting against the edge portion 105A, and the temperature sensors 200 are located on the surface of the side of the rubber frame 104 away from the backplane 101.

The backing plate 105 is configured to avoid direct contact between the reflector 102 and the backplane 101, so as to playing a protective effect on the backlight module 100.

In addition, the backing plate 105 can also play an auxiliary heat dissipation effect to a certain extent. In some embodiments, a thermal conductivity of the backing plate 105 is greater than a thermal conductivity of the reflector, enabling the temperature distribution of the backlight module 100 more uniform.

As shown in FIG. 2, in some other embodiments, the temperature sensors 200 can be provided at a portion where the rubber frame 104 abuts against the reflector 102, specifically, at a portion where the rubber frame 104 abuts against the bending portion 102A, and also at a surface of the side of the rubber frame 104 away from the bending portion 102A.

In a process of implementing the technical solution of the present disclosure, the skilled person finds that a temperature difference between a structure such as a backplane 101 of the display device and the display panel is relatively great, and the temperature change is not obvious. However, a temperature change rate of a reflector 102 is relatively high, and a temperature correlation with the display panel is relatively large. Therefore, providing the temperature sensors 200 between the backplane 101 and the reflector 102 or at the rubber frame 104 abutting against the reflector 102 is capable of improving the accuracy of temperature detection. If the temperature sensors 200 are arranged between the backplane 101 and the reflector 102 and abuts against reflector 102, the temperature detection is more accurate.

In some embodiments, each of the temperature sensors 200 includes an input end for obtaining an input signal, an output end for outputting a temperature signal and a plurality of address ends for obtaining address signals. Input ends of the plurality of temperature sensors 200 are connected to an input voltage end VCC providing the same input signal, output ends of the plurality of temperature sensors 200 are all connected to an output bus, the output bus can be an I2C bus, and an address signal corresponding to each of the temperature sensors 200 is obtained via the plurality of address ends.

In this embodiment, position sensors at different locations are marked by address signals to determine the temperature at the different locations.

In this embodiment, four temperature sensors IC1, IC2, IC3 and IC4 are provided. Referring to FIG. 3 together, IC1 is provided in sub-area A, IC2 is provided in sub-area B, IC3 is provided in sub-area C, and IC4 is provided in sub-area D for exemplary illustration.

As shown in FIG. 8, each of the temperature sensors 200 includes three address terminals A0, A1, and A2, through which a high-level signal 1 and a low-level signal 0 are respectively provided. A total of eight different address signals can be provided.

As shown in Table 1, four kinds of address signals are selected as address signals of the four temperature sensors 200 respectively from the address signals that can be provided. Address signals of respective temperature sensors 200 are different, so that it is possible to mark the positions of the different temperature sensors 200.

TABLE 1

| Address Signal Table of temperature Sensors | | | | |
| --- | --- | --- | --- | --- |
| Area | Temperature sensor | A0 | A1 | A2 |
| A | IC1 | 0 | 0 | 0 |
| B | IC2 | 0 | 0 | 1 |

TABLE 1-continued

| Address Signal Table of temperature Sensors | | | | |
| --- | --- | --- | --- | --- |
| Area | Temperature sensor | A0 | A1 | A2 |
| C | IC3 | 0 | 1 | 0 |
| D | IC4 | 0 | 1 | 1 |

It should be understood that if only four temperature sensors 200 are provided, at least two address ends need to provide address signals to mark the positions of different temperature sensors 200. During the implementation, a different quantity of address ends providing address signals can be provided depending on the quantity of temperature sensors 200.

A method for controlling the display device is provided in the embodiments of the present disclosure.

As shown in FIG. 9, in one embodiment, the method for controlling the display device includes following steps 901 to 903.

In step 901, a temperature of a backlight module is detected by temperature sensors provided in a backlight module of the display device.

In this embodiment, firstly, the temperature of the backlight module is obtained by the temperature sensors. Specifically, a corresponding temperature value is determined according to a temperature signal detected by the temperature sensors.

In one embodiment, the backlight module includes N backlight areas and N groups of temperature sensors arranged corresponding to the N backlight areas. In each group of temperature sensors, a quantity of the temperature sensors is one or more, and the display panel includes N display areas corresponding to the N backlight areas.

In this embodiment, N is a positive integer, and illustratively, N is equal to 4 when applied to the display device including the reflector shown in FIG. 3 or FIG. 4, the quantity of each group of temperature sensors is 1 when applied to the display device including the reflector shown in FIG. 3, and the quantity of each group of temperature sensors is 5 when applied to the display device including the reflector shown in FIG. 3.

This step 901 specifically includes: detecting temperatures of the N backlight areas by the N groups of temperature sensors, respectively.

That is to say, separately detecting the temperature of each backlight area contributes to improving the accuracy of the temperature detection of the backlight module, so that targeted compensation can be performed on each area of the display panel, which contributes to improving the compensation effect.

In some embodiments, each of the temperature sensors includes an output end for outputting temperature signal and a plurality of address ends for obtaining address signals. Input ends of the plurality of temperature sensors are coupled to an input voltage end providing the same input signal, and output ends of the plurality of temperature sensors are each coupled to an output bus.

Exemplary, the temperature sensors can be arranged in accordance with the embodiment shown in FIG. 8. The step 901 can further include:

obtaining the address signals and the temperature signals transmitted by the plurality of the temperature sensors via the output bus;
    determining a correspondence between the temperature signals and the backlight areas according to the address signals;

determining a temperature of each of the backlight areas according to the temperature signals.

In the present embodiment, in a case where the backlight module comprises N sub-areas, different address signals are provided for the temperature sensors. While obtaining the temperature signals, address signals corresponding to the temperature sensors are also obtained so as to determine the correspondence between the obtained temperature signals and the backlight areas; and then the temperature of each backlight area is determined according to the temperature signal of this backlight area.

In step 902, a temperature of the display panel of the display device is determined according to the backlight module.

After the backlight module is determined, the temperature of the display panel is determined according to the temperature of the backlight module.

Illustratively, in a case where the display panel comprises N display areas, the step 902 specifically includes: detecting a temperature of the N backlight areas by the N groups of temperature sensors, respectively.

It would be understood that the temperature of each display area of the display panel can be determined according to the correspondence between each display area and the corresponding backlight area.

In some embodiments, the step 902 can further include:

obtaining a preset correspondence, where the preset correspondence is a change relationship between a temperature difference measured in advance between the backlight module and the display panel in relation to working time of the display device; and calculating the temperature of the display panel according to the preset correspondence and the temperature of the backlight module.

The temperature measured by the temperature sensors is the temperature of the backlight module rather than the temperature of the display panel, and therefore, it is necessary to further calculate to obtain the temperature of the display panel.

In this embodiment, the correspondence between the temperature of the backlight module and the display panel under different working time is measured in advance through experiments. For example, a temperature change table over time can be established, and the temperature difference between the display panel and the backlight module during different working time of the display device can be recorded as the preset correspondence.

After detecting and obtaining the temperature of the backlight module, according to the working time of the display device, the temperature of the display panel is queried from the temperature change table over time.

In some embodiments, the obtaining the preset correspondence includes:

detecting the temperature of the backlight module when the display device is not in operation via the temperature sensors as an ambient temperature; and determining the preset correspondence matching the ambient temperature according to the ambient temperature.

It should be understood that when the ambient temperature is different, the temperature difference between the display panel and the backlight module is different. Therefore, the ambient temperature is further obtained in the embodiment, and the preset correspondence is invoked according to the ambient temperature.

During the implementation, the display device can be firstly tested under different temperature environments to obtain the change relationship of the temperature of the backlight module and the display panel over time, and the change relationship is stored as the above-mentioned preset correspondence. In a working process, invoking the corresponding preset correspondence according to the ambient temperature can improve the accuracy of temperature estimation of the display panel.

In step 903: the color coordinates of the display panel is compensated according to a preset compensation table corresponding to the temperature of the display panel.

Finally, the color coordinates of the display device are compensated according to the preset compensation table so that the color coordinates of the display device are within a preset range, thereby making the display effect of the display device relatively stable.

Hereinafter, the method for controlling the display device is further described exemplarily.

During the process of implementing the present disclosure, the skilled person finds that the temperature change of the display panel is related to operating time of the display device.

Specifically, in an initial stage of operation of the display device, the temperature of the display panel gradually increases, and after a certain period of operation, the temperature of the display panel tends to be stable.

Refer to Table 2, which is a table of temperature change over time obtained from a test, the table of temperature change over time records a correspondence between the temperature of the display panel and the backlight module of the display device in different positions and the operating time of the display module.

A first row of Table 2 represents positions. A, B, C and D respectively represent measurement results of the temperature sensors located at the four areas A, B, C and D of the reflector in FIG. 3. PA, PB, PC and PD respectively represent temperatures of four areas of the display panel corresponding to the four areas A, B, C and D of the reflector.

The leftmost column of Table 2 lists the operating time of the display device in minutes. Data in the table is temperature values in degrees Celsius for positions in the first row at corresponding operating time.

TABLE 2

| | | | | | | | | |
|---|---|---|---|---|---|---|---|---|
| | Temperature-Time Table | | | | | | | |
| | A | B | C | D | PA | PB | PC | PD |
| 0 | 23.65 | 24.16 | 24.33 | 24.58 | 23.53 | 23.51 | 23.68 | 23.68 |
| 5 | 44.4 | 50.45 | 49.37 | 56.76 | 33.86 | 32.11 | 33.89 | 34.33 |
| 10 | 49 | 55.57 | 54.72 | 61.56 | 41.71 | 38.94 | 40.2 | 42.03 |
| 15 | 51.85 | 58.78 | 58.1 | 64.55 | 46.25 | 41.5 | 44.85 | 46.84 |
| 20 | 53.85 | 60.78 | 60.23 | 66.44 | 48.7 | 44.46 | 47.2 | 48.87 |
| 25 | 55.25 | 62.11 | 61.66 | 67.49 | 50.68 | 45.56 | 48.96 | 50.87 |
| 30 | 56.25 | 62.87 | 62.4 | 68.11 | 51.76 | 46.22 | 49.94 | 52.05 |
| 35 | 56.8 | 63.39 | 62.92 | 68.63 | 52.18 | 47.11 | 50.22 | 52.43 |
| 40 | 57.35 | 63.86 | 63.42 | 68.93 | 52.72 | 47.41 | 50.91 | 52.95 |
| 45 | 57.55 | 64.06 | 63.78 | 68.96 | 52.86 | 48.17 | 51.18 | 52.82 |
| 50 | 57.7 | 64.09 | 63.87 | 69.17 | 53.02 | 47.98 | 51.06 | 52.47 |
| 55 | 58 | 64.15 | 63.92 | 69.27 | 53.01 | 47.63 | 51.4 | 53.18 |
| 60 | 58.6 | 64.18 | 64.01 | 69.2 | 52.94 | 48.4 | 50.76 | 53.2 |
| 65 | 59.75 | 64.18 | 63.98 | 69.16 | 53.12 | 48.14 | 51.34 | 53.1 |
| 70 | 60.3 | 64.36 | 64.15 | 69.2 | 53.04 | 48.48 | 51.08 | 53.03 |
| 75 | 60.6 | 64.23 | 64.03 | 69.1 | 52.85 | 48.66 | 50.79 | 53.09 |
| 80 | 61 | 64.42 | 64.19 | 69.35 | 53.12 | 48.54 | 51.24 | 53.04 |
| 85 | 61.3 | 64.51 | 64.32 | 69.45 | 53.06 | 47.81 | 51.46 | 53.25 |
| 90 | 61.4 | 64.45 | 64.23 | 69.5 | 52.62 | 47.25 | 51.29 | 53.17 |
| 95 | 61.75 | 64.65 | 64.37 | 69.55 | 52.92 | 48.81 | 50.83 | 53.41 |
| 100 | 61.7 | 64.55 | 64.27 | 69.31 | 53.04 | 48.43 | 51.19 | 53.18 |
| 105 | 61.8 | 64.57 | 64.24 | 69.26 | 52.86 | 48.26 | 50.92 | 53 |
| 110 | 61.85 | 64.6 | 64.3 | 69.36 | 52.81 | 49 | 51.18 | 52.98 |

TABLE 2-continued

| | A | B | C | D | PA | PB | PC | PD |
|---|---|---|---|---|---|---|---|---|
| 115 | 61.95 | 64.64 | 64.31 | 69.44 | 52.85 | 49.55 | 50.88 | 53.67 |
| 120 | 62.1 | 64.63 | 64.27 | 69.42 | 52.86 | 47.9 | 50.98 | 52.94 |

Temperature-Time Table

It can be seen from table 2 that when the display device is not in operation, the temperature of the display panel and the temperature of the backlight module are substantially equal to room temperature. In the present embodiment, the room temperature is about 24 degrees Celsius.

The technical solution of the present embodiment is applied to the display device. The display device in the present embodiment can be a conventional display device, and is more suitable for being applied to the stacked-screen display device, such as the stacked-screen display device in the above-mentioned stacked-screen display device embodiments. It should be understood that since a light control panel is further provided between the backlight module and the display panel of the stacked-screen display device, the temperature difference between the display panel and the backlight module is great.

After testing, it is found that after continuous operation for a certain time, about 40 minutes in this embodiment, the temperature of the display device tends to be relatively stable, and there is a certain temperature difference between the temperature of the display panel and the temperature of the backlight module. There is a certain difference in the temperature difference at different working time.

In order to keep the display effect relatively stable, in the present embodiment, ideally, values of the color coordinates of the control display panel satisfy Wx/Wy: 0.313/0.329, where Wx and Wy are the coordinate values of the color coordinates respectively. Furthermore, considering that a control error and a certain color coordinate difference have a small effect on the actual display effect, in the present embodiment, a certain fluctuation range of the ratio of the color coordinates is allowed. The fluctuation range can be different numerical values, such as 0.05, or 0.005. For example, when the fluctuation range is 0.005, the values of the color coordinates satisfy Wx/Wy: 0.313±0.005/0.329±0.005. In this embodiment, the fluctuation corresponding to the preset range is set to 0.01 or 0.005 to provide a relatively stable display effect.

In this embodiment, different compensation relationships are set according to different temperatures of the display panel, and are recorded in a compensation table, and the compensation table can specifically be an accurate color capture (ACC) table.

As shown in FIG. 10, in the present embodiment, the temperatures are divided into four zones, and corresponding four compensation tables are provided. In compensation stages corresponding to different temperature zones, expected target compensation results are all in the above-mentioned preset ranges. During the implementation, specific quantity of divided temperature zones is not limited to this.

A plurality of compensation tables are pre-measured or pre-calculated and stored in a memory chip, such as a register. When a compensation is required for the display panel, compensation data in the corresponding compensation table is invoked according to the temperature.

As shown in Table 2, there is a certain difference between the temperature of the display panel and the temperature of the backlight module at the same time. With continued reference to Table 2, the difference between the temperature of the display panel and the temperature of the backlight module is changed over time.

In this embodiment, a temperature relationship between the display panel and the backlight module is pretested at different operating time, and a table of temperature change over time similar to table 2 is formed and stored. In the working process, the temperature sensors are used to measure the temperature of the backlight module, then the stored table of temperature change over time is invoked. According to data in the table, the temperature of the display panel at a corresponding moment can be determined according to the working time of the display device and the temperature of the backlight module of the display module. Finally, the corresponding compensation table is invoked according to the temperature of the display panel to compensate for the display effect of the display panel.

Exemplarily, in table 2, the ambient temperature of the backlight module is about 24 degrees Celsius, the temperature of the backlight area A is about 58.6 degrees Celsius when the display device is operated for 60 minutes, the temperature of the display area PA corresponding to the display panel and the backlight area A is about 52.94 degrees Celsius, and the temperature difference thereof is about 5.66 degrees Celsius. In practical application, the ambient temperature is 24 degrees Celsius, the actually measured temperature is about 58 degrees Celsius when the display device is operated for 60 minutes. According to the above-mentioned temperature difference, the temperature of the display area PA is estimated to be about 52.34 degrees Celsius.

It should be understood that change trend of the temperatures of the display device is different when operating at different ambient temperatures. In this embodiment, it is further possible to measure and prepare a temperature change table over time of the display panel and the backlight module at different ambient temperatures in advance, take the temperature of the backlight module measured when the display device is not operating as the ambient temperature, and invoke the change table at the corresponding ambient temperature according to the ambient temperature, which contributes to further improving the accuracy of the temperature calculation for the display panel.

In this way, the technical solution of the present embodiment is capable of determining the temperature of the display panel relatively accurately according to the temperature corresponding relationship between the display panel and the backlight module during different working time, so that the display panel can be compensated more accurately and the compensation effect can be improved.

As shown in FIG. 11, FIG. 11 is partial data in the compensation table corresponding to a certain temperature. In the present embodiment, grey scale values of three different color sub-pixels of red R, green G and blue B corresponding to each grey scale (gamma) at each stage are provided in the compensation table, and according to the grey scale values, corresponding color coordinates can be determined. As shown in FIG. 11, by adjusting the color coordinates, a display state of the display panel can be made substantially uniform, which contributes to improving the display effect.

While the present disclosure has been described with reference to specific embodiments thereof, it will be understood by those skilled in the art that various changes may be made and equivalents may be substituted for elements thereof without departing from the scope of the disclosure. Accordingly, the protection sought herein is as set forth in the claims below.

What is claimed is:

1. A display device, comprising: a backlight module, wherein the backlight module comprises a backplane, a reflector and a diffuser which are stacked in sequence, and the reflector is provided with a plurality of light-emitting units, the backlight module is provided with temperature sensors;

wherein the reflector has a first central axis and a second central axis which are perpendicular to each other; the temperature sensors are arranged on a side of the reflector close to the diffuser and the temperature sensors are symmetrically distributed with respect to the first central axis;

wherein the reflector further comprises two diagonal lines, the diagonal lines intersect with the first central axis and the second central axis, and the temperature sensors are arranged on each of the diagonal lines.

2. The display device according to claim 1, wherein the reflector is in a shape of rectangular; and the temperature sensors are symmetrically distributed with respect to the second central axis.

3. The display device according to claim 2, wherein the reflector is divided into four rectangular sub-areas by the first central axis and the second central axis, and the temperature sensors are symmetrically distributed in each sub-area with respect to two central axes of the sub-area.

4. The display device according to claim 3, wherein a quantity of temperature sensors is four, and the four temperature sensors are each located at a geometric center of the sub-area.

5. The display device according to claim 1, wherein the light-emitting units are arranged on the reflector at equal intervals along a first direction and a second direction, respectively, to form an array of light-emitting units, wherein the first direction and the second direction are different directions, the temperature sensors are located at a geometric center of the nearest four lighting units.

6. The display device according to claim 1, wherein the quantity of temperature sensors is four, and the four temperature sensors are respectively located at four vertices of the backlight module.

7. The display device according to claim 6, wherein at an edge of the backlight module, the reflector forms a bending portion bending away from the backplane, a rubber frame is provided between the bending portion and the backplane, at least part of a surface of the rubber frame extends along a surface of the backplane and a surface of the bending portion, and respectively abuts against the backplane and the reflector, an accommodating cavity is formed inside the rubber frame, and the temperature sensors are located inside the accommodating cavity.

8. The display device according to claim 7, wherein a backing plate is further provided between the backplane and the reflector, the backing plate comprises an edge portion extending between the bending portion and the backplane, and two opposite surfaces of the edge portion respectively abuts against the rubber frame and the backplane; the temperature sensors are arranged at a portion of the rubber frame abutting against the edge portion, and the temperature sensors are located on a surface of a side of the rubber frame away from the backplane.

9. The display device according to claim 1, wherein each of the temperature sensors comprises an input end for obtaining an input signal, an output end for outputting a temperature signal and a plurality of address ends for obtaining address signals, input ends of a plurality of temperature sensors are connected to an input voltage end providing the same input signal, the output ends of the plurality of temperature sensors are all connected to an output bus, and address signals corresponding to each of the temperature sensors are obtained through the plurality of address ends.

10. The display device according to claim 1, wherein the temperature sensors are configured to detect a temperature of the backlight module to compensate the display panel according to the temperature.

11. The display device according to claim 2, wherein the light-emitting units are arranged on the reflector at equal intervals along a first direction and a second direction, respectively, to form an array of light-emitting units, wherein the first direction and the second direction are different directions, the temperature sensors are located at a geometric center of the nearest four lighting units.

12. The display device according to claim 3, wherein the light-emitting units are arranged on the reflector at equal intervals along a first direction and a second direction, respectively, to form an array of light-emitting units, wherein the first direction and the second direction are different directions, the temperature sensors are located at a geometric center of the nearest four lighting units.

13. The display device according to claim 4, wherein the light-emitting units are arranged on the reflector at equal intervals along a first direction and a second direction, respectively, to form an array of light-emitting units, wherein the first direction and the second direction are different directions, the temperature sensors are located at a geometric center of the nearest four lighting units.

14. A display device, comprising:

a backlight module, a light control panel and a display panel which are stacked in sequence, wherein the backlight module comprises a backplane, a reflector and a diffuser which are stacked in sequence, and the reflector is provided with a plurality of light-emitting units, the backlight module is provided with temperature sensors;

wherein the reflector has a first central axis and a second central axis which are perpendicular to each other; the temperature sensors are arranged on a side of the reflector close to the diffuser and the temperature sensors are symmetrically distributed with respect to the first central axis;

wherein the reflector further comprises two diagonal lines, the diagonal lines intersect with the first central axis and the second central axis, and the temperature sensors are arranged on each of the diagonal lines.

15. The display device according to claim 14, wherein the reflector is in a shape of rectangular; and the temperature sensors are symmetrically distributed with respect to the second central axis.

16. The display device according to claim 15, wherein the reflector is divided into four rectangular sub-areas by the first central axis and the second central axis, and the temperature sensors are symmetrically distributed in each sub-area with respect to two central axes of the sub-area.

17. The display device according to claim 16, wherein a quantity of temperature sensors is four, and the four temperature sensors are each located at a geometric center of the sub-area.

18. The display device according to claim 14, wherein the light-emitting units are arranged on the reflector at equal intervals along a first direction and a second direction, respectively, to form an array of light-emitting units, wherein the first direction and the second direction are different directions, the temperature sensors are located at a geometric center of the nearest four lighting units.

19. The display device according to claim 14, wherein the quantity of temperature sensors is four, and the four temperature sensors are respectively located at four vertices of the backlight module.

20. The display device according to claim 19, wherein at an edge of the backlight module, the reflector forms a bending portion bending away from the backplane, a rubber frame is provided between the bending portion and the backplane, at least part of a surface of the rubber frame extends along a surface of the backplane and a surface of the bending portion, and respectively abuts against the backplane and the reflector, an accommodating cavity is formed inside the rubber frame, and the temperature sensors are located inside the accommodating cavity.

* * * * *